UNITED STATES PATENT OFFICE.

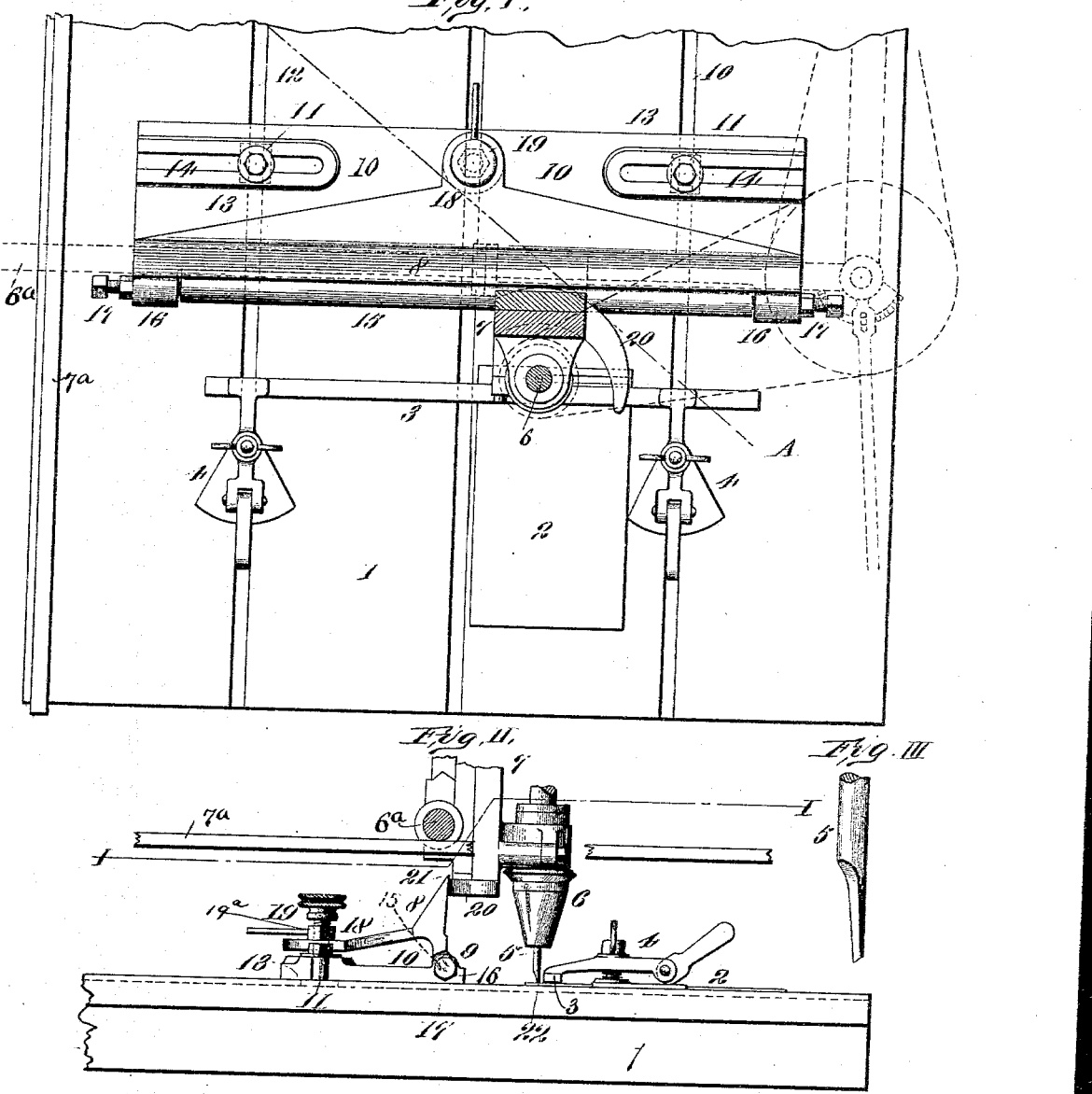

CARL SCHRAUBSTADTER, JR., AND CHARLES R. SCHILLING, OF ST. LOUIS, MISSOURI, ASSIGNORS TO THE WESTERN ENGRAVERS' SUPPLY COMPANY, OF SAME PLACE.

ROUTING-MACHINE.

SPECIFICATION forming part of Letters Patent No. 545,380, dated August 27, 1895.

Application filed March 5, 1894. Serial No. 502,356. (No model.)

*To all whom it may concern:*

Be it known that we, CARL SCHRAUBSTADTER, Jr., and CHARLES R. SCHILLING, of the city of St. Louis, in the State of Missouri, have invented a certain new and useful Improvement in Routing and Channeling Machines, of which the following is a full, clear, and exact description, reference being had to the accompanying drawings, forming part of this specification.

Our present invention relates to certain improvements in machines for routing and forming channels in different objects, such as engraving-plates and other printing-surfaces, and our invention consists in features of novelty hereinafter fully described, and pointed out in the claims.

Figure I is part in plan view and part in horizontal section taken on line I I. Fig. II is a detail elevation. Fig. III is a perspective view of the drill or tool.

Referring to the drawings, 1 represents a suitable table upon which the plate 2, or other article to be operated upon, is placed, and upon which it is held by means of a strip 3 and clamp 4. The strip and clamp correspond substantially with the strips 7 and the clamps shown in Fig. X of our patent, No. 454,774, issued June 23, 1891.

5 represents the tool secured to a spindle 6, mounted in a suitable frame 7, by which it may be moved back and forth in the operation of the machine. The frame 7 slides or works on the swinging arm 6ª, which is supported at its outer end on the rail 7ª, carried by the table 1. These parts are in substance the same as the corresponding parts in the patent referred to, and they require no explanation.

This invention refers to a combined gage and guide 8, which is hinged, as shown at 9, to a plate 10, made fast to the table 1 by means of bolts 11, having heads fitting in grooves 12 in the table. The heads are represented by dotted lines at 13, and are larger than the grooves 12, so that while the bolts can be moved lengthwise of the grooves they are held from vertical movement. The bolts fit in grooves 14 in the plate 10, so that the plate can be shifted endwise or can be turned at an angle to the length of the table. The guide and gage 8 has a rim or roll 15, fitting between ears 16 on the plate 10, and which receives bolts or screws 17, passing through the ears and entering the ends of the roll. The guide and gage has an arm 18 to receive a thumb-nut 19, by which the guide and gage may be adjusted in its vertical position, the lower end of the thumb-screw bearing against the plate 10, and by turning it up or down the vertical face of the gage may be adjusted.

19ª is a jam-nut on the thumb-screw.

During the operation of the tool the guide and gage is in the position shown in Fig. II, at which time a circular segment 20, secured to the spindle-frame 7, bears against the inner vertical face of the guide and gage for the purpose of guiding the tool, and it thus serves to guide the tool whether the part 8 is in the position shown by full lines, Fig. I, or whether it is in the position shown by a dotted line A, Fig. I, or at some other angle. The distance from the pivot 9 of the gage and guide to the point 21 is about equal to the distance from the hinge 9 to the working-point 22 of the tool.

When the article to be operated upon is placed on the table, the spindle 6 is swung to one side out of the way and the gage and guide is swung to bring its edge 21 down upon the article to be worked upon, and thus affords a straight edge for adjusting the work or the plate to be worked upon. After the necessary adjustment is finished the clamp 3 4 is applied. The gage is then brought back to the position shown in Fig. II, and the tool being brought into working position with the segment 20 against the inner face of the guide the machine is ready for operation, the tool striking the plate at the point registered by the edge 21 of the gage when the work is being adjusted to position. Should the gage not be perfectly adjusted and bring the cut too far from the line to which it was set, the raising or lowering of the screw 19 will push the gage 8 over, and in this manner the operator can gradually adjust the tool.

We claim as our invention—

1. In a channeling and routing machine, the combination of a suitable support, a tool provided with a segment, a plate adjustably secured to said support and having hinged thereto a combined gage and guide, and which bears against the said segment substantially as shown and described.

2. In a channeling and routing machine, the combination of a support, a tool, a plate adjustably secured to said support, and a combined gage and guide pivoted to said adjustable plate and adapted to be moved into horizontal position for gaging the position of the tool and into vertical position for guiding the tool, substantially as shown and described.

CARL SCHRAUBSTADTER, Jr.
CHARLES R. SCHILLING.

In presence of—
C. G. EDUARDS,
A. M. EBERSOLE.